United States Patent
Hsieh et al.

(10) Patent No.: US 9,609,270 B2
(45) Date of Patent: Mar. 28, 2017

(54) METHOD FOR PERFORMING A VIDEO TALK ENHANCEMENT FUNCTION AND AN ELECTRIC DEVICE HAVING THE SAME

(71) Applicant: HTC CORPORATION, Taoyuan (TW)

(72) Inventors: Yu-Liang Hsieh, Taoyuan (TW); Bor-Wen Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/801,425

(22) Filed: Jul. 16, 2015

(65) Prior Publication Data

US 2016/0021338 A1 Jan. 21, 2016

Related U.S. Application Data

(60) Provisional application No. 62/025,505, filed on Jul. 17, 2014.

(51) Int. Cl.
*H04N 7/14* (2006.01)
*H04M 3/56* (2006.01)

(52) U.S. Cl.
CPC ............ *H04N 7/147* (2013.01); *H04M 3/567* (2013.01); *H04N 2007/145* (2013.01)

(58) Field of Classification Search
CPC .......... H04N 7/15; H04N 7/147; H04N 7/152; H04N 7/142; H04N 7/141
USPC ...................... 348/14.01, 14.02, 14.03, 14.12
See application file for complete search history.

(56) References Cited

U.S. PATENT DOCUMENTS

| 2006/0195786 | A1 | 8/2006 | Stoen et al. | |
|---|---|---|---|---|
| 2007/0039025 | A1* | 2/2007 | Kraft | H04N 7/147 725/62 |
| 2007/0230794 | A1 | 10/2007 | McAlpine et al. | |
| 2008/0158334 | A1* | 7/2008 | Reponen | G10L 15/26 348/14.02 |
| 2011/0276900 | A1* | 11/2011 | Khan | H04L 67/38 715/753 |
| 2012/0062687 | A1* | 3/2012 | Sai | H04N 7/147 348/14.03 |

(Continued)

FOREIGN PATENT DOCUMENTS

| EP | 1 689 155 A1 | 8/2006 |
|---|---|---|
| TW | 201212647 A1 | 3/2012 |
| WO | WO 2008/033649 A1 | 3/2008 |

*Primary Examiner* — Quoc D Tran
(74) *Attorney, Agent, or Firm* — Birch, Stewart, Kolasch & Birch, LLP (57) ABSTRACT

A method for performing a video talk enhancement (VTE) function in an electric device is provided. A video talk application performs a video call and receiving at least one first frame generated by a camera sensor from a middleware. The input unit receives an input signal to select one of several video talk enhancement modes provided by a video talk enhancement application. Under the video call, the middleware replaces the at least one first frame with a second frame(s) or modifying the at least one first frame according to the selected video talk enhancement mode. The video talk application transmits the modified at least one first frame or the second frame(s) to another electric device, so that the modified at least one first frame or the second frame(s) which is transmitted is shown on the another electric device as a video talk frame.

18 Claims, 6 Drawing Sheets

(56) References Cited

U.S. PATENT DOCUMENTS

2012/0287231 A1* 11/2012 Ravi ................. H04N 7/148
 348/14.12
2015/0358584 A1* 12/2015 Mattson ............. H04N 7/15
 348/14.08

* cited by examiner

| Application Name | Texting | Voice Call | Video Call | Video Call Switch Front/Back Camera | Group Call | Send/Receive Multimedia | Size |
|---|---|---|---|---|---|---|---|
| WeChat | Y | Y | Y | Y | Y | Y | Varies by device |
| Line | Y | Y | Y | Y | N | Y | 19M |
| Skype | Y | Y | Y | Y | Y | Y | Varies by device |
| Tango | Y | Y | Y | Y | N | Y | 22M |
| Hangouts | Y | Y | Y | Y | Y | Y | 11M |
| OOVOO | Y | Y | Y | Y | Y | Y | 21M |

METHOD FOR PERFORMING A VIDEO TALK ENHANCEMENT FUNCTION AND AN ELECTRIC DEVICE HAVING THE SAME

This application claims the benefit of U.S. Provisional Application Ser. No. 62/025,505, filed Jul. 17, 2014, the disclosure of which is incorporated by reference herein in its entirety.

BACKGROUND

Technical Field

The disclosure relates in general to a method for performing a video talk enhancement (VTE) function and an electric device having the same, and more particularly to a method for performing a video talk enhancement function and an electric device having the same under a video call.

Description of the Related Art

In recent years, the resolution of the front camera sensor of the electric device is getting higher and higher, and the use of video talk has become more and more popular. Therefore, how to provide the user with a diversified application with the video talk is emphasized by the industry.

SUMMARY

According to one embodiment, a method for performing a video talk enhancement (VTE) function in an electric device is provided. The electric device has a video talk application, a video talk enhancement application, a middleware, an input unit, a camera sensor and a processor. The method includes the following steps. The video talk application performs a video call and receiving at least one first frame generated by the camera sensor from the middleware between the applications and the camera sensor. The input unit receives an input signal to select one of several video talk enhancement modes provided by the video talk enhancement application. Under the video call, the middleware replaces the at least one first frame with a second frame(s) or modifying the at least one first frame according to the selected video talk enhancement mode. The video talk application receives the modified at least one first frame or the second frame(s) from the middleware. The video talk application transmits the modified at least one first frame or the second frame(s) to another electric device, so that the modified at least one first frame or the second frame(s) which is transmitted is shown on the another electric device as a video talk frame.

According to another embodiment, an electric device for performing a video talk enhancement (VTE) function is provided. The electric device includes an input unit, a processor, and a camera sensor. The input unit is for receiving an input signal. The processor electrically connected to the input unit. The processor is used to perform a video talk application, a video talk enhancement application, and a middleware, the middleware being between the applications and the camera sensor. The camera sensor is electrically connected to the processor. The processor performs the video talk application to perform a video call and the processor performs the middleware to receive at least one first frame generated by the camera sensor. The processor selects one of several video talk enhancement modes provided by the video talk enhancement application according to the input signal. Under the video call, the processor performs the middleware to replace the at least one first frame with a second frame(s) or modify the at least one first frame according to the selected video talk enhancement mode. The processor performs the video talk application to receive the modified at least one first frame or the second frame(s) from the middleware. The processor performs the video talk application to transmit the modified at least one first frame or the second frame(s) to another electric device, so that the modified at least one first frame or the second frame(s) which is transmitted is shown on the another electric device as a video talk frame.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
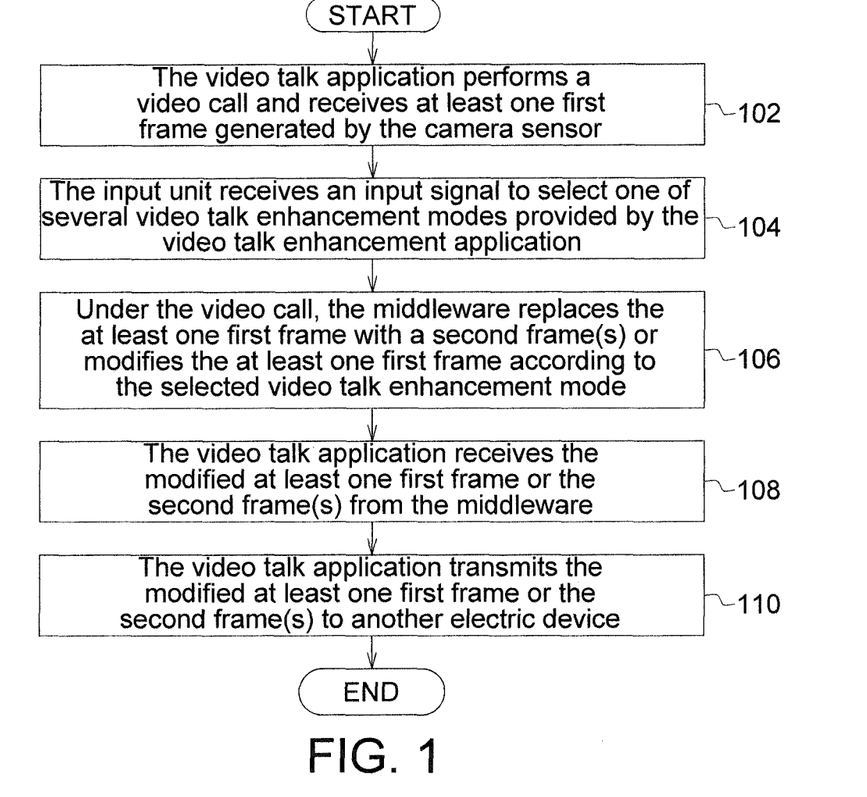
FIG. 1 shows a flow chart for a method for performing a video talk enhancement (VTE) function in an electric device according to an embodiment of the invention.
Figure 2:
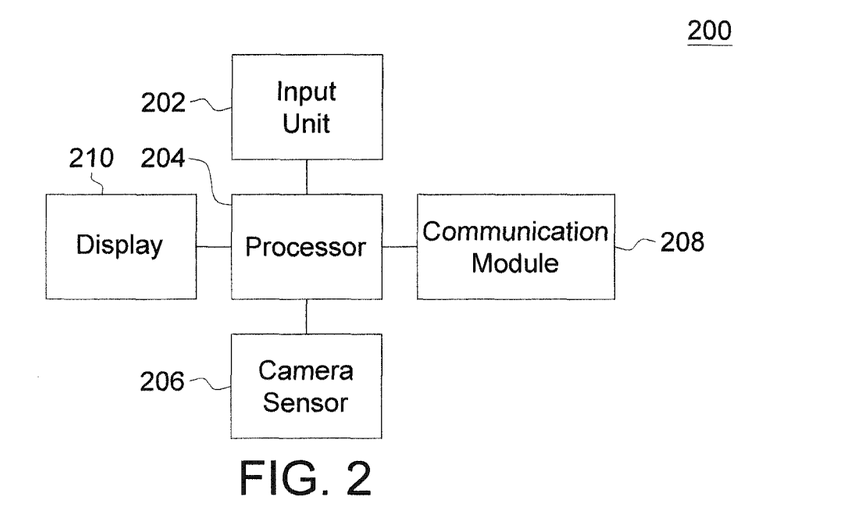
FIG. 2 shows the block diagram of an electric device according to an embodiment of the invention.

FIG. 1 shows a flow chart for a method for performing a video talk enhancement (VTE) function in an electric device according to an embodiment of the invention. The block diagram of the electric device 200 is shown in FIG. 2. The electric device 200 has an input unit 202, a processor 204, and a camera sensor 206. The input unit 202 and the camera sensor 206 are electrically connected to the processor 204. The electric device 200 further has a video talk application, a video talk enhancement application, and a middleware which can be executed by the processor 204. The method includes the following steps. In step 102, the video talk application performs a video call and receives at least one first frame generated by the camera sensor 206 from the middleware between the applications (for example, the video talk application and the video talk enhancement application) and the camera sensor 206. The middleware is, for example, the procedures in the operating system (OS) layer.

After that, in step 104, the input unit 202 receives an input signal to select one of several video talk enhancement modes provided by the video talk enhancement application. Then, in step 106, under the video call, the middleware replaces the at least one first frame with a second frame(s) or the middleware modifies the at least one first frame according to the selected video talk enhancement mode. After that, in the step 108, the video talk application receives the modified at least one first frame or the second frame(s) from the middleware. Then, in step 110, the video talk application transmits the modified at least one first frame or the second frame(s)

to another electric device, so that the modified at least one first frame or the second frame(s) which is transmitted is shown on the another electric device as a video talk frame.

Therefore, even if the application currently executed by an electric device for the video call do not provide the video talk enhancement function, the electric device 200 according to the embodiment can perform the video talk enhancement function and transmits the modified at least one first frame or the second frame(s) which replaces the first frame to the another electric device as a video talk frame. That is, the modified at least one first frame or the second frame(s) can be selected to replace the frame(s) of the video talk, and be transmitted by the same way as a frame(s) for video talk to another electric device. More functions can be provided under a video call, and better experience of using the electric device 200 can be provided.

The electric device 200 can further include display 210. The selected video talk enhancement mode is, for example, one of a screen share mode, a skin beautifying mode, or a video film mode. Under the screen share mode, the frame(s) shown in the display 210 of the electric device 200 can be transmitted to another electric device which is the other party of the video call. Therefore, the frame(s) shown in the display 210 of the electric device 200 can be shared with another electric device. Under the skin beautifying mode, the frame(s) captured by the camera sensor 206 may be modified to make the color of skin in the image of people in the frame be beautified, and the modified frame(s) is transmitted to another electric device which is the other party of the video call. The frame(s) of a video played in the electric device 200 will replace the original frame(s) for video call and the frame(s) of the video will be transmitted to another electric device which is the other party of the video call. Therefore, the another electric device can also play the frame(s) of the video which is originally played in the electric device 200. Other function which can replace the original video talk frame(s) with a modified frame(s) thereof or other frame(s) can also be applied in this embodiment.

The video talk enhancement application can further displays a main floating control interface on the display 210 when the electric device 200 runs the video talk application to perform the video talk with the another electric device. The main floating control interface has at least one of a screen share icon, a skin beautifying icon, and a video film icon. When one of the screen share icon, the skin beautifying icon, and the video film icon is selected, the input unit 202 receives the input signal.

Furthermore, the input unit 202 and the display 210 can be implemented by a touch panel. The electric device 200 can further have a communication module 208 for communicate with other electric device through wireless communication or through Internet.

Figure 3:
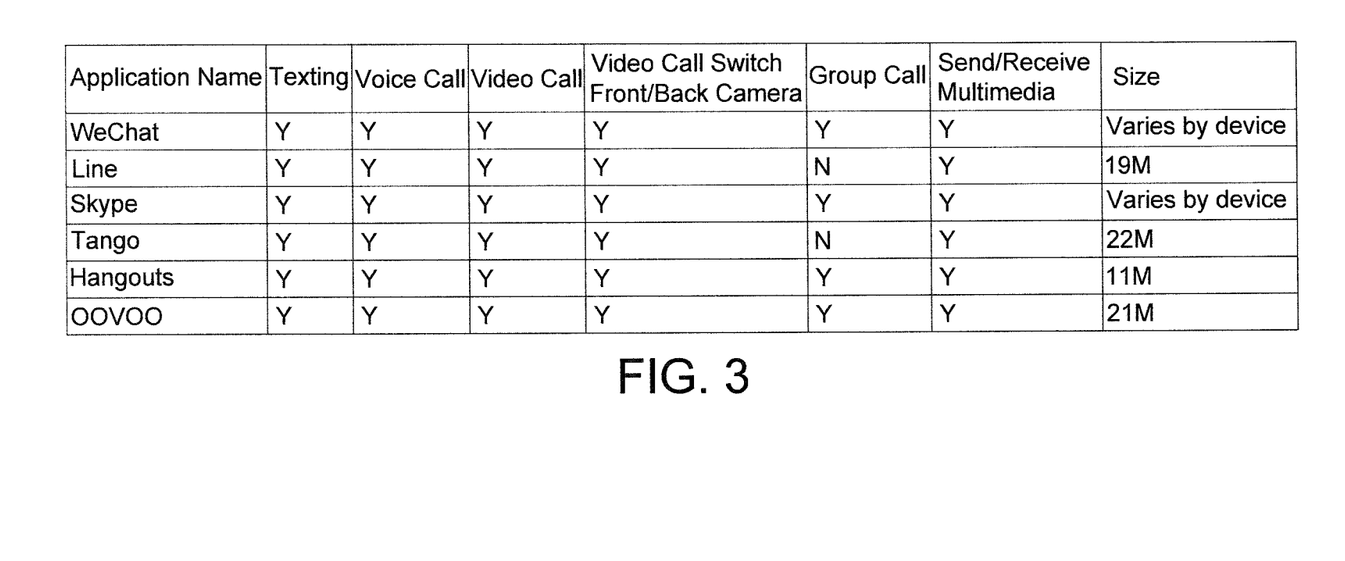
FIG. 3 shows an example of the white list.

The electric device 200 can be a mobile device, such as a smartphone or tablet PC. The operating system of the electric device 200 is, for example, Android operating system. The processor 204 determines whether the electric device 200 is performing the video talk by judging whether the video talk application is performed in foreground and whether the camera sensor 206 is activated. When the video talk application for the video call is performed in foreground and the camera sensor 206 is activated, the processor 204 determines that the electric device 200 is performing the video talk. The video talk application can be one of the applications which can perform video calls listed in a white list. The white list also contains other candidate video talk applications. FIG. 3 shows an example of the white list.

If the application currently executed by the electric device 200 in the foreground is included in a white list of FIG. 3 and the camera sensor 206 is already activated, it is determined that the electric device 200 is performing the video talk, and the main floating control interface will be displayed on the display 210. The main floating control interface is an independent application from the video talk applications and the main floating control interface is not contained in the white list. The main floating control interface can be used as a user operating interface.

Figure 4:
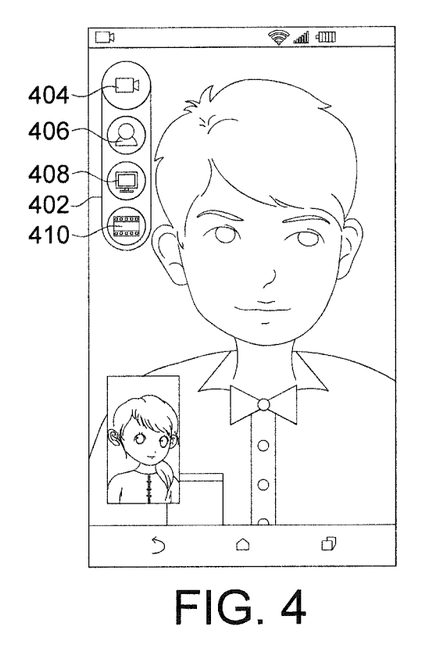
FIG. 4 shows an example of the main floating control interface of the electric device according to an embodiment of the invention.

Referring to FIG. 4, an example of the main floating control interface of the electric device 200 according to an embodiment of the invention is shown. The main floating control interface 402 has a screen share icon 408, a normal mode icon 404, a skin beautifying icon 406, and a video film icon 410, but is not limited thereto. Other icons can be added or some icons can be removed in the main floating control interface 402 according to the functions that the electric device 200 requires. The situation that the screen share icon 408 is pressed or selected by the user will be taken as an example to be described more detailed as follows.

Figure 5A:
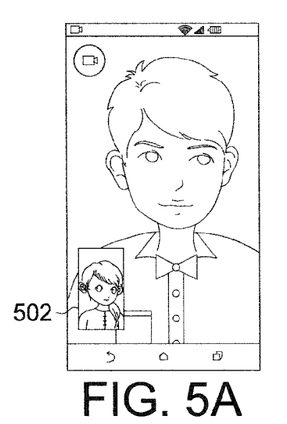
FIGS. 5A~5E shows the corresponding frames displayed on the electric device A.

When the user presses or selects the screen share icon 408, the electric device 200 will execute following operations. Let the operations executed by the electric device A as indicated in FIGS. 5A~5E be taken for example. The electric device A, for example, is on a video talk with an electric device B, and corresponding frames displayed on the electric device B are shown in FIGS. 6A~6E. Referring to FIG. 5A, assume the local frame shot by the camera sensor 206 of the electric device A is frame 502, the frame 502 will be transmitted to the electric device B and displayed as frame 602 of FIG. 6A.

Figure 5B:
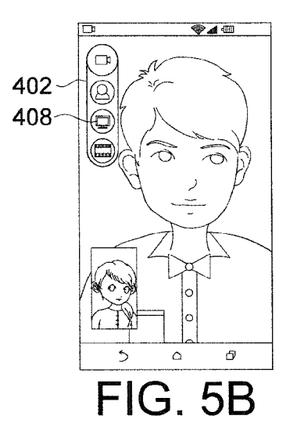
Figure 5C:
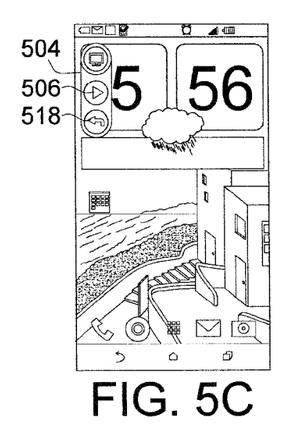

If the application currently executed in the foreground of the electric device A is included in the white list of FIG. 3 and the camera sensor 206 is already activated, the main floating control interface 402 will be displayed by superposition on the frame of the electric device A as indicated in FIG. 5B. When the user of the electric device A selects the screen share icon 408 of the main floating control interface 402, the processor 204 will enter screen share mode and the electric device A will start screen share function, as shown in FIG. 5C.

When the electric device A is under the screen share mode, the display 210 of the electric device A shows a screen share floating control interface 504. The screen share floating control interface 504 includes, for example, a start icon 506 and a return icon 518 as indicated in FIG. 5C. The processor 204 of the electric device A can transmits a predetermined frame 604 to the electric device B before the frame(s) to be shared (i.e. the second frame mentioned above) is selected under the screen share mode, so that the predetermined frame 604 is shown on the electric device B as the video talk frame.

Figure 6A:
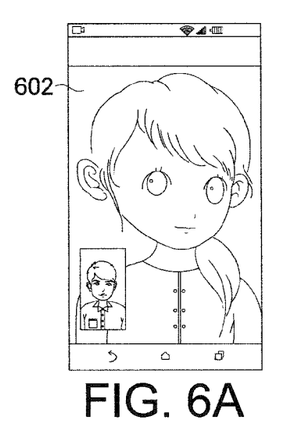
FIGS. 6A~6E shows the corresponding frames displayed on the electric device B.
Figure 6B:
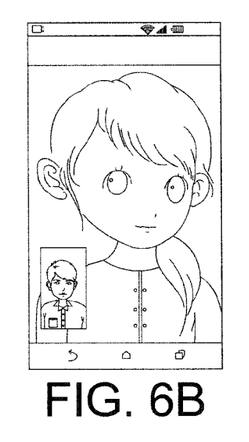
Figure 6C:
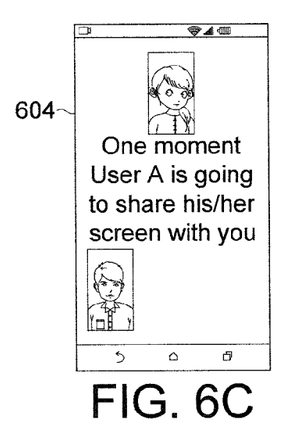
Figure 6D:
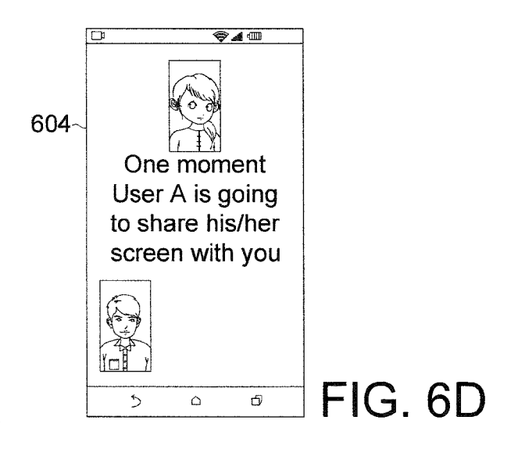

As indicated in FIG. 6C, the electric device B will show the predetermined frame 604 and wait for the frame(s) to be shared to be selected by the electric device A. The predetermined frame 604 can be any static frame predetermined by the electric device A. The predetermined frame 604 may further includes a message informing the user of the electric device B that the electric device A is going to share screen, for example, the message of "One moment, User A is going to share his/her screen with you".

Figure 5D:
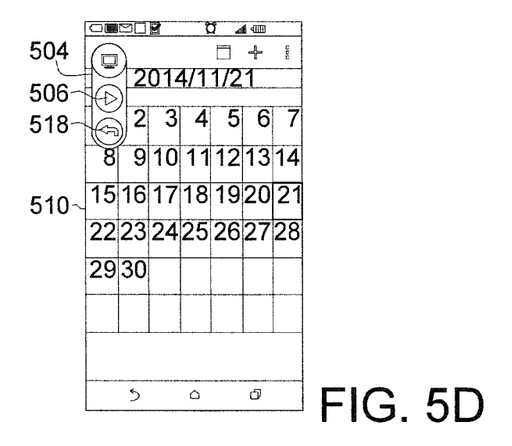

Meanwhile, the user of the electric device A can operate the electric device A to select the frame(s) to be shared. Suppose the user of the electric device A has switched the frame shown in the display 210 to a calendar frame(s) 510 as indicated in FIG. 5D. If the user of the electric device A decides to share the calendar frame(s) 510, the user of the electric device A can select the start icon 506. After the start icon 506 is selected, the frame(s) and following frames to be shared (i.e. calendar frame 510 or the frame stream of the calendar frames 510) are transmitted from the electric device A to the electric device B.

Figure 5E:
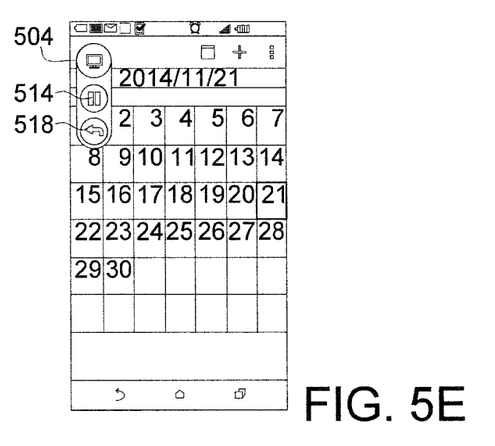
Figure 6E:
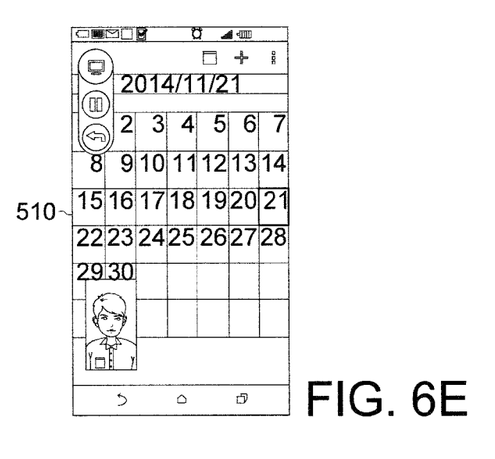

After that, the calendar frame 510 and following frames are displayed on the screen of electric device B as indicated in FIG. 6E. Meanwhile, the screen share floating control interface 504 displayed on the electric device A will be changed to includes, for example, a pause icon 514 and a return icon 518 as indicated in FIG. 5E.

If the user of the electric device A wants to stop screen share for a short period, the user of the electric device A can select the pause icon 514 as shown in FIG. 5E. The processor 204 of electric device A can, for example, transmits the predetermined frame 604 to the electric device B after the pause icon 514 is selected, and the processor 204 stops transmitting the frame to be shared after the pause icon 514 is selected, so that the predetermined frame 604 is shown on the electric device B as the video talk frame. After that, the screen share floating control interface 504 displayed on the electric device A will be changed to include a start icon 506 as indicated in FIG. 5D. Then, the user of the electric device A can operate the electric device A again to change the frame shown in the display 210. If the user of the electric device A decides to share another frame, the user of the electric device A can select the start icon 506 again to select the frame to be shared. After the start icon 506 is selected, the frame(s) and following frames to be shared are transmitted from the electric device A to the electric device B.

Referring to FIG. 5D or FIG. 5E, if the user of the electric device A wants to terminate the screen share mode, the user of the electric device A can select the return icon 518. After the return icon 518 is selected, the processor 204 of electric device 200 stops transmitting the frame to be shared, and the screen share mode is terminated when the return icon 518 is selected. The electric device A will return to the video talk state under the normal mode as indicated in FIG. 5A or FIG. 5B. Meanwhile, the electric device B also returns to the video talk state under the normal mode as indicated in FIG. 6A or FIG. 6B.

Figure 7:
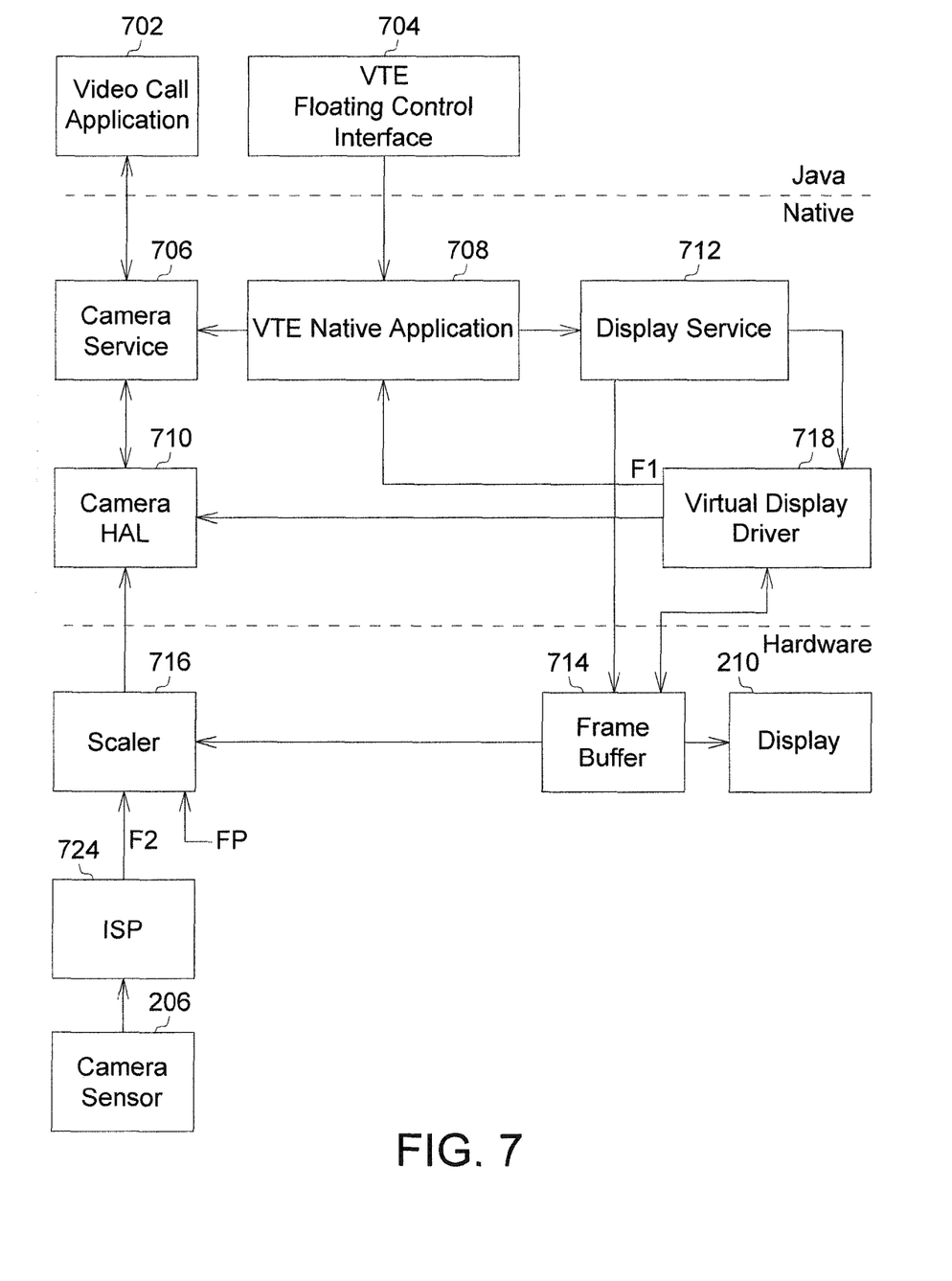
FIG. 7 shows an example of software/hardware architecture of electric device for executing the screen share function.

Referring to FIG. 7, an example of software/hardware architecture of electric device 200 for executing the screen share function is shown. After the video talk function is activated by the video talk application 702, the main floating control interface 402 will be automatically executed and displayed on the screen of the electric device 200. The main floating control interface 402 is, for example, a video talk enhancement (VTE) floating control interface 704. The video talk application 702 is included in the white list of FIG. 3, such as Skype or Line. Whether the video talk function is activated by the video talk application 702 is determined by judging if the video talk application 702 is executed in the foreground and the camera sensor 206 is already activated, which imply that the user is using the video talk function.

During the video talk under the normal mode, the video talk application 702 will call the camera service 706 to activate the camera function. When the user of the electric device A selects the screen share icon 408 of the main floating control interface 402, the electric device A will start screen share function. Meanwhile, the VTE floating control interface 704 will call the VTE native application 708 immediately. Then, the VTE native application 708 informs the camera service 706 that the electric device A will enter the screen share mode.

Then, the camera service 706 instructs the virtual display driver 718 to provide frame data currently displayed on the display 210 of the electric device A through the camera hardware adaptation layer (HAL) 710. There are many methods for providing the frame data, and two methods are exemplified below for explanatory purpose. According to the first method, the frame data currently displayed on the display 210 of the electric device A is stored to the frame buffer 714 by the display service 712. Then, the content of the frame buffer 714 is read by the virtual display driver 718. After that, the frame data (such as frame F1) is transmitted to the VTE Native application 708 by the virtual display driver 718. Then, the frame data is transmitted to the camera service 706 by the VTE Native application 708. After that, the frame data is transmitted to the video talk application 702 by the camera service 706, and the frame data is transmitted to the electric device B by the video talk application 702 to achieve screen sharing.

According to the second method, the frame data currently displayed on the display 210 of the electric device A is stored to the frame buffer 714 by the display service 712. Then, the frame data is read from the frame buffer 714 and scaled by the scaler 716. After that, the scaled frame data is further provided to the camera service 706 by the scaler 716 through the camera HAL 710. Then, the frame data is transmitted to the video talk application 702 by the camera service 706, and the frame data is transmitted to the electric device B by the video talk application 702 to achieve screen share.

In the above disclosure, the virtual display driver 718 can be realized by such as the native application "Virtual Display" of the Android operating system. In another embodiment, the virtual display driver 718 can directly provide the frame data that the electric device A wants to display on the display 210 without reading frame data from frame buffer 714.

Under the normal mode, the video talk application 702 transmits a captured image to the electric device B. Details of the transmission method are as follows. Firstly, an image is captured by the camera sensor 206. Then, a frame F2 is obtained after the image is processed by the image signal processor (ISP) 724. Then, after the resolution of the frame F2 is reduced by the scaler 716, the frame F2 is transmitted to the camera service 706 through the camera HAL 710, and is further transmitted to the electric device B at the other end of video talk by the video talk application 702.

When the user has just select the screen share icon 408 of the main floating control interface 402 but has not yet selected the start icon 506 for the sharing frame, the video talk application 702 of the electric device A will immediately transmit the predetermined frame FP to the electric device B to inform the electric device B that screen share function is going to be operated. There are many methods of generating the predetermined frame by the video talk application 702, and one is exemplified below for explanatory purpose.

According to one of the methods of generating the predetermined frame FP, the VTE floating control interface 704 informs the camera service 706 through the VTE native application 708 that the predetermined frame will be transmitted to the electric device B. The VTE native application 708 can inform the camera service 706 the file path of the predetermined frame FP, and the camera service 706 instructs the camera HAL 710 to read the predetermined frame FP through the file path. After the predetermined frame FP is scaled by the scaler 716, the scaled predetermined frame FP is provided to the camera service 706 through the camera HAL 710. Then, the scaled predetermined frame FP is transmitted to the video talk application 702 by the camera service 706. Then, the predetermined frame FP is transmitted to the other end of video talk (the electric device B) by the video talk application 702. The predetermined frame FP can be a static picture, such as a static picture prepared and stored in the file path by the VTE native application 708. The message that the electric device A will share screen can also be shown on the static picture.

The video talk application 702 and the VTE floating control interface 704 are such as Java applications. The camera service 706, the VTE native application 708, the display service 712, the camera HAL 710, and the virtual display driver 718 are such as native applications. The VTE native application 708 can apply Binder mechanism of Android Inter-Process Communication (IPC) mechanism. The above architecture can be implemented under the Android operating system or other operating systems. The middleware mentioned above can includes, for example, the camera service 706, the VTE native application 708, and the camera HAL 710.

To summarize, the main floating control interface 402 (VTE floating control interface 704) can control the camera service 706 to select a frame from the frames displayed on the display 210, and transmits the selected frame to the video talk application 702 (such as Skype or Line) to perform the screen share function. When screen share function of the main floating control interface 402 (the VTE floating control interface 704) is activated (for example, the screen share icon 408 is selected), the frame data displayed on the display 210 is received from the virtual display driver 718 or the frame buffer 714. The camera service 706 can transmits the frame data to the video talk application 702, and the frame data is transmitted to the other end of the video talk by the video talk application 702 for screen share.

The software/hardware architecture of electric device 200 for executing skin beautifying function and the video film function is similar to the architecture for executing screen share function. For example, when skin beautifying function is performed, the frame(s) captured by the camera sensor 206 can be modified by the middleware and then the modified frame(s) is transmitted to another electric device as the video talk frame by the video talk application 202. When the video film function is performed, the video film frame(s) which is played by the processor 204 can be transmitted to the video talk application 702 by the middleware to replace the original video talk frame(s). The video film frame(s) is then transmitted to another electric device as the video talk frame by the video talk application 202.

By using main floating control interface 402 (VTE floating control interface 704), the embodiments of the invention can achieve at least one of the screen share function, skin beautifying function, and the video film function which is not originally supported in video talk applications and can achieve these functions in different video talk applications without having to modifying the programming code of the video talk application 702 (such as Skype and Line). By providing the main floating control interface 402 (VTE floating control interface 704) and the VTE native application 708 and so on by original equipment manufacturers (OEM), the screen share function, the skin beautifying function, or the video film function can be performed when various video talk applications included in the white list are executed. The video talk applications in the white list do not have to have the screen share function, the skin beautifying function, or the video film function. Since the above objects of the invention can be achieved without having to modify the programming code of the video talk applications, the user can use more advanced video talk modes, another information sharing method (for example, the screen share function) and other further functions (for example, the skin beautifying function and the video film function) is provided to achieve a better experience of use. Therefore, the electric device of the embodiments of the invention advantageously possesses market competitiveness.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for performing a video talk enhancement (VTE) function in an electric device, the electric device having a video talk application, a video talk enhancement application, a middleware, an input unit, a camera sensor and a processor, the method comprising:
   performing, by the video talk application, a video call and receiving at least one first frame generated by the camera sensor from the middleware between the applications and the camera sensor;
   receiving an input signal by the input unit to select one of a plurality of video talk enhancement modes provided by the video talk enhancement application;
   under the video call, the middleware replacing the at least one first frame with a second frame(s) or modifying the at least one first frame according to the selected video talk enhancement mode;
   receiving, by the video talk application, the modified at least one first frame or the second frame(s) from the middleware;
   transmitting, by the video talk application, the modified at least one first frame or the second frame(s) to another electric device, so that the modified at least one first frame or the second frame(s) which is transmitted is shown on the another electric device as a video talk frame, wherein the video talk enhancement modes comprise a screen share mode, under the screen share mode, the modified at least one first frame or the second frame(s) displayed on the electric device is shared with the another electric device as a screen share frame; and
   transmitting a predetermined frame to the another electric device by the processor before the modified at least one first frame or the second frame(s) is transmitted under the screen share mode, so that the predetermined frame is shown on the another electric device to inform the another electric device that the screen share mode is going to be operated.

2. The method according to claim 1, wherein the video talk enhancement modes further comprise a skin beautifying mode or a video film mode.

3. The method according to claim 2, further comprising displaying a main floating control interface by the video talk enhancement application when the electric device runs the video talk application to perform the video talk with the another electric device, and the main floating control interface having at least one of a screen share icon, a skin beautifying icon, and a video film icon, wherein the step of receiving the input signal further comprises receiving the input signal by the input unit when one of the screen share icon, the skin beautifying icon, and the video film icon is selected.

4. The method according to claim 1, further comprising:
   determining, by the video talk enhancement application, whether the electric device is performing the video talk by judging whether the video talk application is performed in foreground and whether the camera sensor is activated.

5. The method according to claim 4, wherein the video talk application is one of a plurality of candidate video talk applications listed in a white list.

6. The method according to claim 2, further comprising:
showing a screen share floating control interface when the electric device is under the screen share mode, wherein the screen share floating control interface has a start icon;
wherein the step of transmitting the second frame(s) is performed after the start icon is selected.

7. The method according to claim 6, wherein the screen share floating control interface further has a return icon; the method further comprises stopping transmitting the second frame(s) after the return icon is selected.

8. The method according to claim 6, wherein the screen share floating control interface further comprises a pause icon and a return icon; the method further comprises a step of pausing transmitting the second frame(s) when the pause icon is selected, and a step of terminating the screen share mode when the return icon is selected.

9. The method according to claim 8, further comprising:
transmitting the predetermined frame to the another electric device by the processor after the pause icon is selected; and
stopping transmitting the second frame(s) by the processor after the pause icon is selected, so that the predetermined frame is shown on the another electric device as the video talk frame.

10. An electric device for performing a video talk enhancement (VTE) function, comprising:
an input unit, for receiving an input signal;
a processor, electrically connected to the input unit, the processor being used to perform a video talk application, a video talk enhancement application, and a middleware, the middleware being between the applications and the camera sensor; and
a camera sensor, electrically connected to the processor;
wherein the processor performs the video talk application to perform a video call and the processor performs the middleware to receive at least one first frame generated by the camera sensor;
wherein the processor selects one of a plurality of video talk enhancement modes provided by the video talk enhancement application according to the input signal;
wherein under the video call, the processor performs the middleware to replace the at least one first frame with a second frame(s) or modify the at least one first frame according to the selected video talk enhancement mode;
wherein the processor performs the video talk application to receive the modified at least one first frame or the second frame(s) from the middleware;
wherein the processor performs the video talk application to transmit the modified at least one first frame or the second frame(s) to another electric device, so that the modified at least one first frame or the second frame(s) which is transmitted is shown on the another electric device as a video talk frame, wherein the video talk enhancement modes comprise a screen share mode, under the screen share mode, the modified at least one first frame or the second frame(s) displayed on the electric device is shared with the another electric device as a screen share frame, and
wherein a predetermined frame is transmitted to the another electric device by the processor before the modified at least one first frame or the second frame(s) is transmitted under the screen share mode, so that the predetermined frame is shown on the another electric device to inform the another electric device that the screen share mode is going to be operated.

11. The electric device according to claim 10, wherein the video talk enhancement modes further comprise a skin beautifying mode or a video film mode.

12. The electric device according to claim 11, further comprising a display for displaying a main floating control interface when the processor runs the video talk application to perform the video talk with the another electric device, and the main floating control interface having at least one of a screen share icon, a skin beautifying icon, and a video film icon, wherein the input signal is received by the input unit when one of the screen share icon, the skin beautifying icon, and the video film icon is selected.

13. The electric device according to claim 10, wherein the processor determines whether the electric device is performing the video talk by judging whether the video talk application is performed in foreground and whether the camera sensor is activated.

14. The electric device according to claim 13, wherein the video talk application is one of a plurality of candidate video talk applications listed in a white list.

15. The electric device according to claim 11, further comprising a display for showing a screen share floating control interface when the electric device is under the screen share mode, wherein the screen share floating control interface has a start icon, and after the start icon is selected, transmitting the second frame(s) is performed.

16. The electric device according to claim 15, wherein the screen share floating control interface further has a return icon, the processor stops transmitting the second frame(s) after the return icon is selected.

17. The electric device according to claim 15, wherein the screen share floating control interface further comprises a pause icon and a return icon, the processor pauses transmitting the second frame(s) when the pause icon is selected, and the processor terminates the screen share mode when the return icon is selected.

18. The electric device according to claim 17, wherein the processor transmits the predetermined frame to the another electric device after the pause icon is selected, and the processor stops transmitting the second frame(s) after the pause icon is selected, so that the predetermined frame is shown on the another electric device as the video talk frame.

* * * * *